(12) United States Patent  
Malakapalli et al.

(10) Patent No.: US 8,692,832 B2  
(45) Date of Patent: Apr. 8, 2014

(54) PARA-VIRTUALIZED ASYMMETRIC GPU PROCESSORS

(75) Inventors: Meher Prasad Malakapalli, Santa Clara, CA (US); Stuart Raymond Patrick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 13/355,790

(22) Filed: Jan. 23, 2012

(65) Prior Publication Data

US 2013/0187932 A1     Jul. 25, 2013

(51) Int. Cl.
| | |
|---|---|
| G06T 1/00 | (2006.01) |
| G06F 15/00 | (2006.01) |
| G06F 15/80 | (2006.01) |
| G06F 15/16 | (2006.01) |

(52) U.S. Cl.
USPC ........... 345/501; 345/522; 345/502; 345/503; 345/504; 345/505

(58) Field of Classification Search
None
See application file for complete search history.

(56) References Cited

U.S. PATENT DOCUMENTS

| | | | |
|---|---|---|---|
| 7,623,732 B1 * | 11/2009 | Thieret et al. ................. | 382/279 |
| 7,800,610 B2 | 9/2010 | Bakalash et al. | |
| 7,944,450 B2 | 5/2011 | Bakalash et al. | |
| 2004/0117375 A1 * | 6/2004 | Saha et al. ....................... | 707/10 |
| 2007/0088856 A1 * | 4/2007 | Zhang ............................... | 710/6 |
| 2009/0150576 A1 * | 6/2009 | Madruga et al. ................ | 710/28 |
| 2009/0259775 A1 * | 10/2009 | Faragher ......................... | 710/26 |
| 2009/0305790 A1 | 12/2009 | Lu et al. | |
| 2010/0110089 A1 | 5/2010 | Paltashev et al. | |
| 2010/0115510 A1 | 5/2010 | Ford et al. | |
| 2010/0214301 A1 | 8/2010 | Li et al. | |
| 2011/0102443 A1 * | 5/2011 | Dror et al. ..................... | 345/522 |
| 2011/0169840 A1 | 7/2011 | Bakalash | |

OTHER PUBLICATIONS

Dowty, et al., "GPU Virtualization on VMware's Hosted I/O Architecture", In Newsletter of ACM SIGOPS Operating Systems Review, vol. 43, Issue No. 3, Jul. 2009, pp. 73-82.

Lagar-Cavilla, et al., "VMM-Independent Graphics Acceleration", In Proceedings of the 3rd International Conference on Virtual Execution Environments, 2007, pp. 10.

"Virtualized Remote Workstation", Retrieved on: Nov. 14, 2011, Available at: http://www.teradici.com/pcoip/pcoip-products/virtualized-remote-workstation.php.

* cited by examiner

*Primary Examiner* — James A Thompson
*Assistant Examiner* — Tapas Mazumder
(74) *Attorney, Agent, or Firm* — Henry Gabryjelski; Raghu Chinagudabha; Micky Minhas

(57) ABSTRACT

The present invention extends to methods, systems, and computer program products for providing asymmetric Graphical Processing Unit ("GPU") processors in a para-virtualized environment. A virtual GPU ("vGPU") within a child partition of the para-virtualized environment includes a kernel-mode driver ("KMD") and a user-mode driver ("UMD"). The KMD includes a plurality of virtual nodes. Each virtual node performs a different type of operation in parallel with other types of operations. The KMD is declared as a multi-engine GPU. The UMD schedules operations for parallel execution on the virtual nodes. A render component within a root partition of the para-virtualized environment executes GPU commands received from the vGPU at the physical GPU. A plurality of memory access channels established between the KMD and the render component communicate GPU commands between a corresponding virtual node at the KMD and the render component.

17 Claims, 2 Drawing Sheets

PARA-VIRTUALIZED ASYMMETRIC GPU PROCESSORS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Some computer systems are configured to provide para-virtualized execution environments, which allow guest software to share hardware devices of a single computer system in an isolated manner. Generally, para-virtualized execution environments comprise a plurality of partitions, supported by a hypervisor. Each partition provides an isolated execution environment for software executing therein. The partitions generally include a root partition and one or more child partitions. The root partition runs a host operating system and manages a virtualization stack. The root partition may gain access to physical devices. Each child partition hosts guest software (e.g., guest operating systems and guest applications). Child partitions are provided access to physical devices through virtual devices and software interfaces of the hypervisor.

Some para-virtualized execution environments provide child partitions (and guest software executing therein) with para-virtualized access to one or more physical graphics processing units ("GPUs"). GPUs are processing devices configured to perform parallel processing tasks, such as graphics rendering tasks. GPU(s) generally contain a plurality of physical hardware processing modules (also referred to as nodes or engines) that are capable of concurrent operation. Typically, each node/engine performs a different type of task (e.g., three-dimensional rendering, video acceleration, etc.). As such, these nodes/engines are often referred to as being asymmetric.

Existing para-virtualization solutions provide a "virtual GPU" ("vGPU") within the child partition that appears to guest software as being a physical GPU. The vGPU provides an interface for receiving GPU commands and data from guest software. The vGPU works in connection with one or more components within the root partition to execute received commands on any available physical GPU(s). Existing vGPUs present guest software a single processing node that processes all GPU commands. Existing vGPUs then serialize tasks that are to be performed on the physical GPU, such that only a single task is executed on the physical GPU at a time (as opposed to executing a plurality of tasks in parallel on the physical GPU). As such, the vGPU utilizes a single node/engine at the physical GPU(s) at any given time, resulting in underutilization of some of the more performant features of the physical GPU.

BRIEF SUMMARY

The present invention extends to methods, systems, and computer program products for providing asymmetric Graphical Processing Unit ("GPU") processors in a para-virtualized environment.

Some embodiments include a method for providing asymmetric virtualized GPU nodes in a child partition of a para-virtualized execution environment. A virtual GPU ("vGPU") is instantiated within the child partition. The vGPU is configured to virtualize the physical GPU. The vGPU includes a kernel-mode driver (KMD) and a user-mode driver (UMD). The KMD includes a plurality of virtual nodes. Each virtual node is configured to perform a different type of operation in parallel with one or more other types of operations. The KMD is declared as a multi-engine GPU. The UMD is configured to schedule operations of different types for parallel execution on the virtual nodes. A render component is also instantiated within a root partition of the para-virtualized execution environment. The render component is configured to execute GPU commands received from the vGPU at the physical GPU.

A plurality of memory access channels are established between the KMD and the render component. Each memory access channel corresponds to a different virtual node at the KMD. Each memory access channel is configured to communicate GPU commands between the corresponding virtual node and the render component. The UMD schedules a plurality of different types of operations for execution on different virtual nodes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
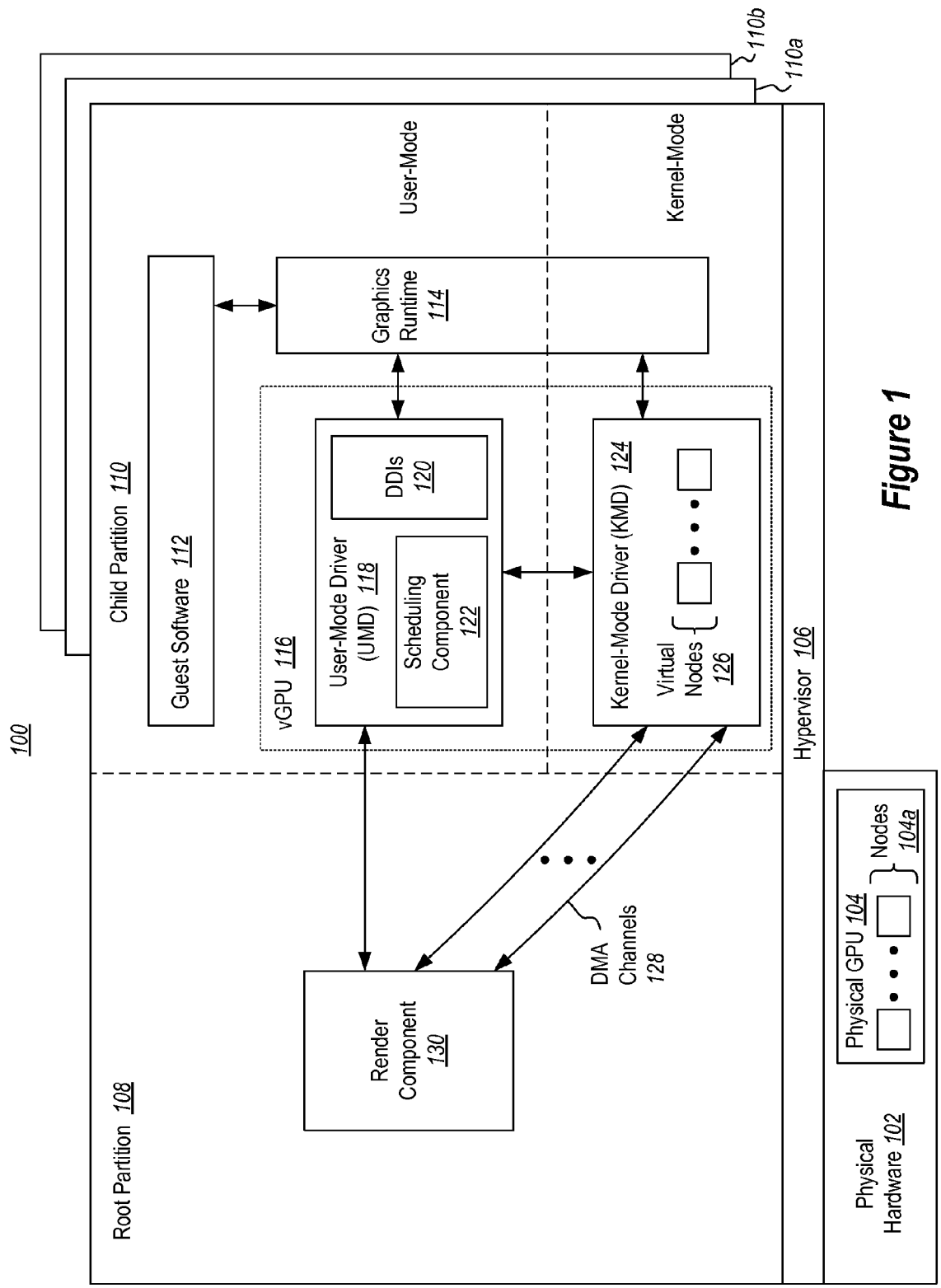
FIG. 1 illustrates an example computer architecture that facilitates executing parallel operations with a virtual graphics processing unit ("GPU").

The present invention extends to methods, systems, and computer program products for providing asymmetric Graphical Processing Unit ("GPU") processors in a para-virtualized environment.

Some embodiments include a method for providing asymmetric virtualized GPU nodes in a child partition of a para-virtualized execution environment. A virtual GPU ("vGPU") is instantiated within the child partition. The vGPU is configured to virtualize the physical GPU. The vGPU includes a kernel-mode driver (KMD) and a user-mode driver (UMD). The KMD includes a plurality of virtual nodes. Each virtual node is configured to perform a different type of operation in parallel with one or more other types of operations. The KMD is declared as a multi-engine GPU. The UMD is configured to schedule operations of different types for parallel execution on the virtual nodes. A render component is also instantiated within a root partition of the para-virtualized execution environment. The render component is configured to execute GPU commands received from the vGPU at the physical GPU.

A plurality of memory access channels are established between the KMD and the render component. Each memory access channel corresponds to a different virtual node at the KMD. Each memory access channel is configured to communicate GPU commands between the corresponding virtual node and the render component. The UMD schedules a plurality of different types of operations for execution on different virtual nodes.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates executing parallel operations with a virtual GPU. Referring to FIG. 1, computer architecture 100 includes physical hardware 102. Physical hardware 102 can include any appropriate hardware devices, such as one or more general purpose processors, system memory, and the like. As depicted, physical hardware 102 includes physical GPU 104, and may include a plurality of physical GPUs.

Physical GPU 104 is a processing device that is configured to perform parallel processing tasks, such as graphics rendering tasks, video acceleration, etc. As depicted, physical GPU 104 includes nodes 104a. Nodes 104a comprise one or more physical nodes or engines that are configured to perform processing tasks. Nodes 104a may be referred to as being "asymmetric," since each node is configured to handle different types of graphics operations. Nodes 104a can comprise any number of nodes, which can perform a variety of operation types. For example, one node may be configured to process video accelerated rendering commends (e.g., a DirectX® video acceleration ("DXVA") node), while another node may be configured to process three-dimensional rendering commands.

Computer architecture 100 also includes hypervisor 106. Hypervisor 106 executes on top of physical hardware 102 and supports a para-virtualized execution environment. The para-virtualized execution environment comprises a plurality of partitions. Each partition provides a logical unit of isolation, in which guest software executes. As depicted, computer architecture 100 includes root partition 108 and child partition 110.

Root partition 108 executes a host operating system, and has direct access to physical hardware 102 (as depicted by root partition 108 appearing over physical hardware 102). Each child partition provides an execution environment for executing guest software (e.g., operating systems and/or applications) and may access physical hardware 102 indirectly (i.e., in a para-virtualized manner). That is, each child partition provides one or more software interfaces (e.g., virtualized hardware) to guest software. The guest software, in turn, uses the software interface(s) to access physical hardware 102. Computer architecture 100 can include a plurality of child partitions 110, 110a and 110b, for example.

Render component 130 within root partition 108 is configured to execute any requested GPU functions on physical GPU 104. In particular, render component 130 is configured to schedule any physical GPU-specific graphics commands received from components of child partition 110 for execution on physical GPU 104, and to create proper context for executing those commands. For example, render component 130 is configured to create any appropriate composition device(s) (e.g., a composition device representing a desktop) at physical GPU 104 for executing graphics commands.

As depicted, child partition 110 includes guest software 112, vGPU 116, and graphics runtime 114. Guest software 112 comprises an operating system, and/or an application program executing within an operating system. Graphics runtime 114 may be part of guest software, such as a runtime included as part of an operating system. Graphics runtime 114 corresponds to one or more graphics rendering frameworks, and provides APIs which enable guest software 112 to request execution of GPU functions of the supported rendering framework(s). As depicted, graphics runtime 114 may execute as part of a user-mode and/or as part of a kernel-mode of child partition 110.

Child partition 110 exposes vGPU 116 to graphics runtime 114 and thus provides guest software 112 access to vGPU 116 through graphics runtime 114. vGPU 116 virtualizes physical GPU 104, enabling graphics runtime 114 (and guest software 112) to indirectly access physical GPU 104. As such, vGPU 116 is configured to expose all, or a subset, of the functionality of physical GPU 104.

vGPU 116 is configured to expose one or more software interfaces to graphics runtime 114 that enable graphics runtime 114 to call vGPU 116 for accessing physical GPU 104. vGPU 116, in turn, works in conjunction with render component 130 in root partition 108 to execute any requested GPU operations on physical GPU 104.

vGPU 116 includes user-mode driver 118 (which, as depicted, executes in user-mode of child partition 110) and kernel-mode driver 124 (which, as depicted, executes in kernel-mode of child partition 110). User-mode driver 118 is configured to construct hardware contexts and command buffers from received graphics commands, and to pass the command buffers to kernel-mode driver 124 for additional processing. In particular, user-mode driver 118 is configured to convert graphics commands issued by graphics runtime 114 into hardware-specific commands (i.e., commands that are specific to physical GPU 104). As part of the conversion, user-mode driver 118 maintains proper hardware context for physical GPU 104. For example, user-mode driver 118 translates logical values for settings affecting a rendering pipeline into values and corresponding physical settings.

Kernel-mode driver 124, in turn, is configured to receive command buffers from user-mode driver 118 (as indicated by the arrows between user-mode driver 118 and kernel-mode driver 124) and to construct corresponding direct memory access ("DMA") buffers. When it is time for a DMA buffer to be processed by GPU 104, kernel-mode driver 124 is configured to submit the DMA buffer to render component 130 for rendering at physical GPU 104.

User-mode driver 118 is configured to expose one or more device driver interfaces ("DDIs") 120 that enable graphics runtime 114 to request execution of GPU operations at physical GPU 104. As depicted by the arrow between user-mode driver 118 and graphics runtime 114, graphics runtime 114 can send graphics commands to user-mode driver 118, and user-mode driver 118 can respond as appropriate. User-mode driver 118 exposes DDIs 120 corresponding to GPU functionality that is supported by one or more rendering frameworks. In some embodiments, DDIs 120 include DDIs related to the DirectX® rendering framework from Microsoft® Corporation. In other embodiments, DDIs 120 include DDIs related to a different rendering framework, such as the OpenGL® rendering framework from Silicon Graphics, Inc.

vGPU 116 is configured to expose a plurality of virtual nodes (or engines) to graphics runtime 114, and to coordinate the scheduling of parallel operations on the virtual nodes. As depicted, for example, kernel-mode driver 124 includes virtual nodes 126. Each virtual node corresponds to a function type that can be effectively executed in parallel with other different functions. Each virtual node comprises a distinct DMA engine that is independent of the other virtual nodes. Each DMA engine is configured to perform distinct DMA operations that are triggered by one or more other components, such as user-mode driver 118, graphics runtime 114, or a port driver (not shown).

Virtual nodes 126 may include one or more asymmetric virtual nodes (e.g., nodes which may have a physical analogue), such as a rendering node that performs rendering, and/or a video acceleration node that performs video accelerated rendering commands (e.g., a DXVA node). Each asymmetric virtual node performs an entirely different type of function that is independent of what another virtual node does in terms of computation.

Virtual nodes 126 may include one or more virtual symmetric nodes (e.g., nodes that have no physical analogue), such as a lock/unlock node that performs a memory read from GPU memory to system memory or a memory write from system memory to GPU memory. Virtual symmetric nodes typically only have meaning within the context of a particular operation, and are typically used within the context of a symmetric virtual node.

Kernel-mode driver 124 may include a number and configuration of virtual nodes 126 that is different from nodes 104a at physical GPU 104. For example, even if nodes 104a includes only a single node, virtual nodes 126 at vGPU 116 can include a plurality of nodes. As such, vGPU 116 may extract some parallelism by performing overlapping operations at vGPU 116. Thus, physical GPU 104 need not support multiple nodes in order for vGPU 116 to implement multiple nodes and increase performance over previous vGPU solutions.

As indicated, virtual nodes 126 may include one or more nodes that do not have a physical analogue (symmetric nodes). For example, an auxiliary node in virtual nodes 126 can perform lock/unlock memory operations in DMA, or an auxiliary node in virtual nodes 126 can create/initialize a resource that is later used for a rendering operation. As such, virtual nodes 126 can include one or more nodes that perform non-rendering types of operations. Of course, a variety of virtual nodes can be utilized to reflect and utilize all of nodes 104a at physical GPU 104.

As depicted, kernel-mode driver 124 and render component 130 are configured to establish one or more DMA channels 128. Each DMA channel 128 corresponds to a different one of virtual nodes 126. As such, DMA channels 128 comprise a number of channels at least as great as the number of virtual nodes 126. Other communications channels may also be established between render component 130 and kernel-mode driver 124, such as one or more management channels. When establishing DMA channels 128, each channel is assigned a unique identifier. The unique identifiers are used by kernel-mode driver 124 and render component 130 when using the channels. Use of separate channels and corresponding unique identifiers prevents competition by virtual nodes 126 for use of a DMA channel.

In addition, user-mode driver 118 includes scheduling component 122. Scheduling component 122 is configured to schedule operations for execution on virtual nodes 126. In particular, when user-mode driver 118 receives graphics commands from graphics runtime 114 (i.e., graphics commands related to functionality exposed by DDIs 120), scheduling component 122 is configured to select specific DMA operations that can be parallelized to assign those operations to a specific virtual node in virtual nodes 126.

In addition, scheduling component 122 is configured to synchronize operations across virtual nodes 126. At times, a first virtual node may need rendering to be completed on a second virtual node before the first virtual node can proceed. Of course, scheduling component 122 can synchronize operations across more than two nodes. Scheduling component 122, which is aware of the configuration of virtual nodes 126 and operations to be performed, is configured to schedule operations on virtual nodes 126 in a synchronized manner.

In some embodiments, synchronization is achieved through signaling. For example, scheduling component 122 can schedule an operation on a first virtual node. The first virtual node is configured to signal when its operation is complete, and then to wait for a signal from a second virtual node. This in turn, results in a signal on a DMA channel corresponding to the first virtual node, followed by a wait that needs to be satisfied by the second node. The second virtual node follows a similar process where it signals followed by a wait to be satisfied from the first virtual node.

vGPU 116 also handles fence reporting. In particular, each operation requested by graphics runtime 114 is assigned a unique fence identifier. Fence identifiers are used to define an order in which graphics runtime 114 expects to receive results of the operations. User-mode driver 118 and kernel-mode driver 124 of vGPU 116 abstract details of virtual nodes 126 from graphics runtime, and ensure that when operations complete they are reported back to graphics runtime in proper fence order.

Figure 2:
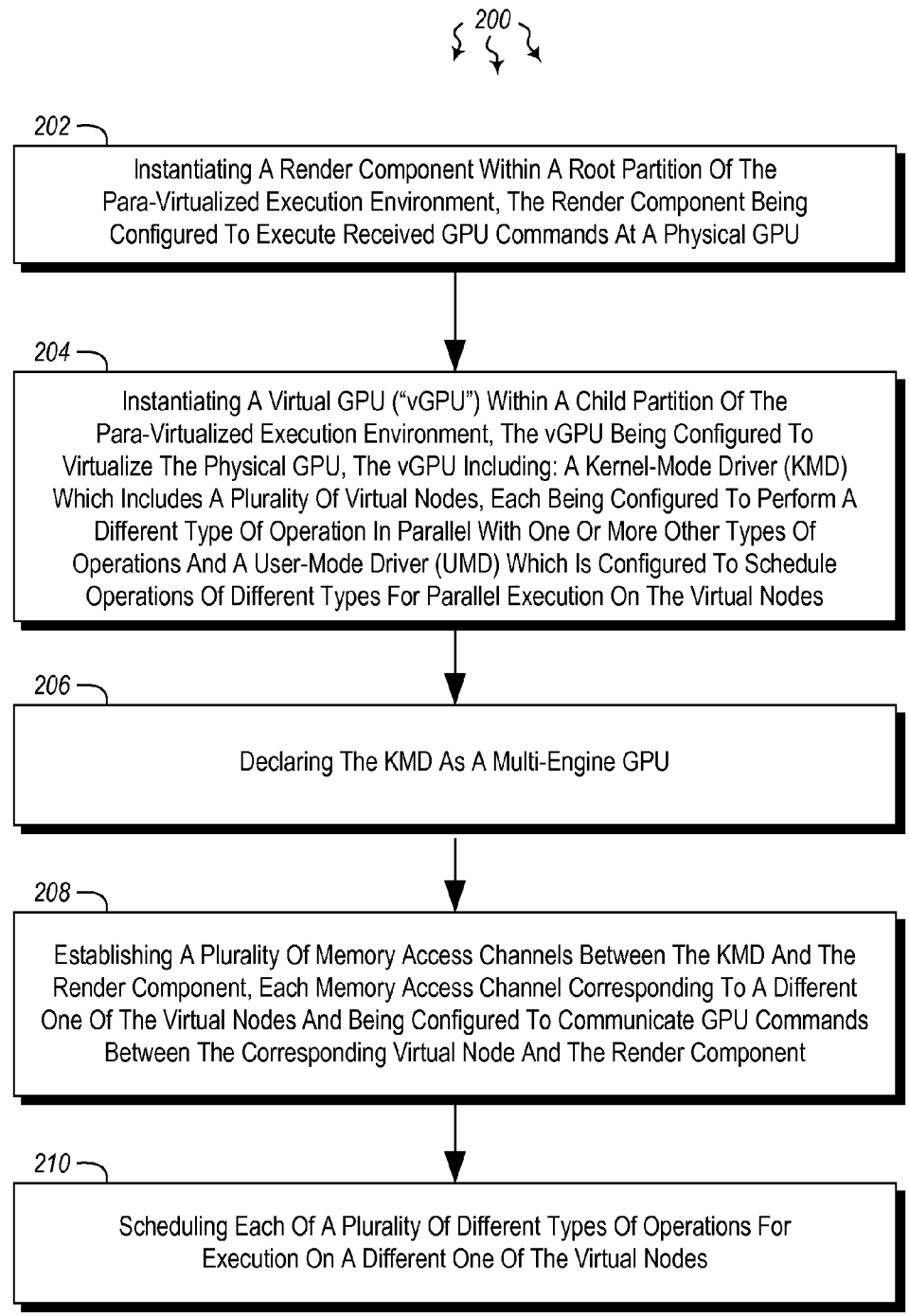
FIG. 2 illustrates a flow chart of an example method for providing asymmetric virtualized GPU nodes in a child partition of a para-virtualized execution environment.

FIG. 2 illustrates a flow chart of an example method 200 for providing asymmetric virtualized GPU nodes in a child partition of a para-virtualized execution environment. Method 200 will be described with respect to the components and data of computer architecture 100.

Method 200 includes an act of instantiating a render component within a root partition of the para-virtualized execution environment, the render component being configured to execute received GPU commands at a physical GPU (act 202). For example, render component 130 can be instantiated within root partition 108. Render component 130 has direct access to physical GPU 104 by virtue of executing within root partition 108, and can schedule operations received from vGPU 116 for execution on physical GPU 104.

Method 200 also includes an act of instantiating a vGPU within a child partition of the para-virtualized execution environment, the vGPU being configured to virtualize the physical GPU, the vGPU including: a KMD which includes a plurality of virtual nodes, each being configured to perform a different type of operation in parallel with one or more other types of operations and a UMD which is configured to schedule operations of different types for parallel execution on the virtual nodes (act 204). For example, vGPU 116 can be instantiated within child partition 110. vGPU 116 can be configured to virtualize physical GPU 104, and to provide a software interface for graphics runtime 114 to request execution of operations at physical GPU 104. vGPU includes kernel-mode driver 124, which includes virtual nodes 126. Each virtual node is configured to execute a different type of operation. There may be a one-to-one correspondence between virtual nodes 126 and nodes 104a, or there may be a different number and type of virtual nodes 126 than nodes 104a. vGPU 116 also includes user-mode driver 118. User-mode driver 118 includes scheduling component 122, which schedules operations on different virtual nodes, and which synchronizes the operations across all nodes.

Method 200 also includes an act of declaring the KMD as a multi-engine GPU (act 206). For example vGPU 116 can declare kernel-mode driver 124 as a multi-engine or multi-node GPU, as opposed to a single-engine GPU, thereby exposing virtual nodes 126 at kernel-mode driver 124.

Method 200 also includes an act of establishing a plurality of memory access channels between the KMD and the render component, each memory access channel corresponding to a different one of the virtual nodes and being configured to communicate GPU commands between the corresponding virtual node and the render component (act 208). For example, render component 130 and kernel-mode driver 124 can establish DMA channels 128. In particular, DMA channels 128 can include a separate DMA channel for each virtual node 126 at kernel-mode driver 124. Each DMA channel can be assigned a different identifier.

Method 200 also includes an act of scheduling each of a plurality of different types of operations for execution on a different one of the virtual nodes (act 210). For example, scheduling component 122 can schedule a plurality of different types of operations for execution on different virtual nodes 126. These operations can be requested by graphics runtime 114, and may originate from guest software 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for providing asymmetric virtualized graphics processing unit (vGPU) nodes in a child partition of a para-virtualized execution environment for a computing system that includes one or more processors, system memory and a physical graphics processing unit (GPU), the method comprising:
   an act of instantiating a render component within a root partition of the para-virtualized execution environment, the render component being configured to execute received GPU commands at the physical GPU;
   an act of instantiating a virtual GPU ("vGPU") within a child partition isolated from the root partition, the vGPU being configured to virtualize the physical GPU, the vGPU including:
      a kernel-mode driver (KMD) which includes a plurality of virtual nodes specific to the instantiated vGPU of the isolated child partition, each virtual node comprising a direct memory access (DMA) engine that is distinct from every other DMA engine, and each DMA engine being configured to perform a different type of operation in parallel with one or more other types of operations performed by one or more other DMA engines; and
      a user-mode driver (UMD) which is configured to schedule operations of different types for parallel execution on the DMA engines of the virtual nodes;
   an act of declaring the KMD as a multi-engine GPU;
   an act of establishing a plurality of direct memory access (DMA) channels which are at least as great in number as the number of DMA engines of the virtual nodes, each DMA channel having a unique identifier used by the KMD and render component to prevent competition by the DMA engines of the virtual nodes when accessing a DMA channel to communicate GPU commands between the corresponding DMA engine of a virtual node and the render component; and
   an act of the UMD scheduling each of a plurality of different types of operations for execution on a different one of the DMA engines of the virtual nodes.

2. The method as recited in claim 1, wherein the plurality of virtual nodes of the KMD exceeds a number of physical nodes at the physical GPU.

3. The method as recited in claim 1, wherein the act of the UMD scheduling each of the plurality of different types of operations for execution on a different one of the virtual nodes comprises an act of the UMD tracking which processing operation is being performed at each of the virtual nodes.

4. The method as recited in claim 1, wherein the act of the UMD scheduling each of the plurality of different types of operations for execution on a different one of the virtual nodes comprises an act of the UMD synchronizing execution of the plurality of operations across the virtual nodes.

5. The method as recited in claim 4, wherein the act of the UMD synchronizing execution of the plurality of operations across the virtual nodes comprises:
   an act of the UMD scheduling a first operation to run on a first node; and
   an act of the UMD scheduling at least one additional operation that is dependent on the first operation to run on one or more additional nodes subsequent to completion of the first operation.

6. The method as recited in claim 5, wherein the act of the UMD scheduling the at least one additional operation comprises an act of configuring the first node to signal the one or more additional nodes when the first operation is complete.

7. The method as recited in claim 1, wherein each of the plurality of different types of operations has a fencing identifier that identifies an order of the operations, the method further comprising an act of reporting completion of each of the plurality of different types of operations according to fencing order.

8. The method as recited in claim 1, wherein the plurality of virtual nodes include at least one asymmetric virtual node and at least one symmetric virtual node.

9. The method as recited in claim 1, wherein at least one of the plurality of virtual nodes comprises a virtual node that is configured to perform a non-rendering and non-video acceleration operation type.

10. One or more hardware storage devices containing computer-executable instructions for implementing at a computer system a method for providing asymmetric virtualized GPU (vGPU) nodes in a child partition of a para-virtualized execution environment, wherein the method comprises;
   instantiating a render component within a root partition of the para-virtualized execution environment, the render component being configured to execute received GPU commands at a physical GPU;
   instantiating a virtual GPU ("vGPU") within a child partition isolated from the root partition, the vGPU being configured to virtualize the physical GPU, the vGPU including:
      a kernel-mode driver (KMD) which includes a plurality of virtual nodes specific to the instantiated vGPU of the isolated child partition, each virtual node comprising a direct memory access (DMA) engine that is distinct from every other DMA engine, and each DMA engine being configured to perform a different type of operation in parallel with one or more other types of operations performed by one or more other DMA engines; and
      a user-mode driver (UMD) which is configured to schedule operations of different types for parallel execution on the DMA engines of the virtual nodes;
   declaring the KMD as a multi-engine GPU;
   establishing a plurality of direct memory access (DMA) channels which are at least as great in number as the number of DMA engines of the virtual nodes, each DMA channel having a unique identifier used by the KMD and render component to prevent competition by the DMA engines of the virtual nodes when accessing a DMA channel to communicate GPU commands between the corresponding DMA engine of a virtual node and the render component; and
   the UMD scheduling each of a plurality of different types of operations for execution on a different one of the DMA engines of the virtual nodes.

11. One or more hardware storage devices as recited in claim 10, wherein at least one of the virtual nodes is configured to perform a rendering operation.

12. One or more hardware storage devices as recited in claim 10, wherein at least one of the virtual nodes is configured to perform a video acceleration operation.

13. One or more hardware storage devices as recited in claim 10, wherein at least one of the virtual nodes does not have a corresponding physical node at the physical GPU.

14. One or more hardware storage devices as recited in claim 13, wherein the virtual node that does not have a corresponding physical node at the physical GPU comprises a lock/unlock node that performs memory operations between the physical GPU and the system memory.

15. One or more hardware storage devices as recited in claim 10, wherein at least one of the virtual nodes has a corresponding physical node at the physical GPU.

16. One or more hardware storage devices as recited in claim 15, wherein the render component is configured to execute GPU commands received from the virtual node having a corresponding physical node at the physical GPU.

17. A computer system, the computer system comprising:
one or more processors;
system memory;
one or more graphics processing units ("GPUs"); and
one or more computer storage devices storing computer-executable instructions which represent a plurality of components, including:
a render component, the render component being configured to execute within a root partition of a para-virtualized execution environment and to execute GPU commands at the physical GPU; and
a virtual GPU ("vGPU"), the vGPU being configured to execute within a child partition of the para-virtualized execution environment and to virtualize the physical GPU, the vGPU including:
a kernel-mode driver (KMD), the KMD being configured to declare itself as a multi-engine GPU by at least exposing a plurality of virtual nodes to a graphics runtime, each virtual node comprising a direct memory access (DMA) engine that is distinct from every other DMA engine, and each DMA engine being configured to perform a different type of operation in parallel with one or more other types of operations performed by one or more other DMA engines, the KMD also being configured to establish a plurality of direct memory access (DMA) channels with the render component, the DMA channels being at least as great in number as the number of DMA engines of the virtual nodes, and each DMA channel having a unique identifier used by the KMD and render component to prevent competition by the DMA engines of the virtual nodes when accessing a DMA channel, and each DMA being configured to communicate GPU commands to the render component for execution at the physical GPU; and
a user-mode driver (UMD), the UMD being configured to schedule operations of different types for parallel execution on the DMA engines of the virtual nodes and to synchronize those operations across the virtual nodes.

* * * * *